United States Patent [19]
Schadler

[11] 3,958,080
[45] May 18, 1976

[54] VISUAL INSPECTION APPARATUS FOR CONDUITS

[75] Inventor: Walter Schadler, Triesen, Liechtenstein

[73] Assignee: Josef Kaiser AG Fahrzeugwerk, Schaanwald, Liechtenstein

[22] Filed: June 5, 1975

[21] Appl. No.: 584,150

[30] Foreign Application Priority Data
June 11, 1974 Switzerland.......................... 7935/74

[52] U.S. Cl............................ 178/7.91; 178/DIG. 1; 178/DIG. 38
[51] Int. Cl.².......................... H04N 7/18; H04N 5/26
[58] Field of Search.......... 178/68, DIG. 1, DIG. 38, 178/7.91

[56] References Cited
UNITED STATES PATENTS
3,715,484  2/1973  Latall................... 178/6.8
3,885,091  5/1975  Fish ............................ 178/DIG. 38

Primary Examiner—Howard W. Britton
Attorney, Agent, or Firm—Hans Berman

[57] ABSTRACT

Visual inspection apparatus for the interior of conduits has a protective, cylindrical housing filled with inert gas under superatmospheric pressure. A radial end wall of the housing has a transparent central portion and at least one transparent peripheral portion. The objective lens system of a TV camera is mounted in the housing cavity behind the central portion. Electric light sources are mounted in the housing behind the peripheral end wall portions. Light of the source is prevented from reaching the camera on a path within the housing by an opaque partition in the housing cavity and by an opaque zone of the end wall separating the central and peripheral portions.

10 Claims, 5 Drawing Figures

VISUAL INSPECTION APPARATUS FOR CONDUITS

This invention relates to visual inspection apparatus, and particularly to apparatus for inspecting the interior of sewers, water lines, and like conduits having a diameter of at lest four inches.

Remotely controlled television cameras producing a visual image of the interior of sewers and other conduits have been used successfully prior to this invention. Because they may have to operate in explosive atmospheres, such cameras have been enclosed in fluid-tight protective housings filled with an inert gas at superatmospheric pressure which prevents entry of explosive gas even in the event of a minor leak.

The light sources available heretofore for sewer inspecting TV cameras left something to be desired. Adequate illumination is available for TV cameras sequentially viewing very small fields to detect cracks in drill pipes and the like. A TV camera for sewer service must view the entire circumference of the sewer simultaneously, and its field of view should encompass a length of sewer pipe which is several times the pipe diameter.

Prior attempts at mounting the light source in or on the camera housing were unsatisfactory. Much light entered the lens from the light source without being reflected from the object to be viewed, whereby the transmitted TV image lost contrast and definition. It was then attempted to illuminate the sewer walls from a light source supported outside the camera housing in front of the lens and shielded from the lens. While the arrangement provided backlighting and strong contrast on the sewer wall between the lens and the light source, the field of the lens was partly obstructed by the light source and the shield.

It is the primary object of this invention to provide a visual inspection apparatus of the type described which avoids the shortcomings of known devices.

According to the invention, the camera is installed in the cavity of a protective, elongated housing. The cavity is longitudinally bounded by a transverse end wall which has a plurality of transparent portions offset from each other transversely of the direction of housing elongation. An objective lens system in the cavity is aligned with one of the transparent end wall portions in the afore-mentioned direction, and a light source in the cavity is aligned with another transparent end wall portion in the same direction.

An opaque partition extends inward of the cavity from the end wall. It is interposed between the light source and the objective lens system and shields the lens system from the light of the source. An inner face of the end wall is directed toward the cavity, and an outer end wall is offset from the inner face outward of the cavity. An opaque zone of the end wall interposed between the two transparent portions of the same prevents passage of light from the light source directly through the two transparent end wall portions to the lens system because the opaque zone extends from the inner end wall face toward the outer face, and the partition is aligned with the zone.

The camera associated with the objective lens system thus produces an image in response to light received by the objective lens system through the outer face of the corresponding end wall portion only, the image not being blurred by light from the light source reaching the lens system without first being reflected by the object whose image is to be produced.

Other features, additional objects, and many of the attendant advantages of this invention will readily be appreciated as the same becomes better understood by reference to the following detailed description of preferred embodiments when considered in connection with the appended drawing in which.

Figure 1:
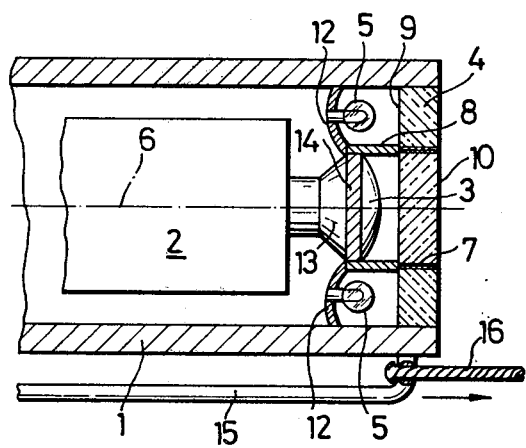
FIG. 1 shows inspection apparatus of the invention in fragmentary, side-elevational section on the line I—I in FIG. 2.
Figure 2:
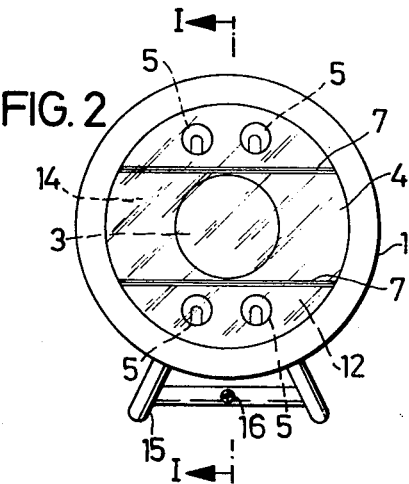
FIG. 2 illustrates the apparatus of FIG. 1 in front elevation.

Referring now to the drawing in detail, and initially to FIG. 1, there is seen a steel tube 1 which provides a hermetically sealed, protictive housing for a television camera 2 filled with nitrogen under normally superatmospheric pressure. The objective lens system 3 of the camera is mounted in the housing cavity on an opaque barrel 13 closely adjacent a transparent, radial end wall 4 of the camera housing. Four quartz halogen lamps 5, better seen in FIG. 2, are mounted in pairs above and below the lens system 3 and spaced from the optical axis 6 of the lens system 3 whose field angle is approximately 90°.

Figure 5:
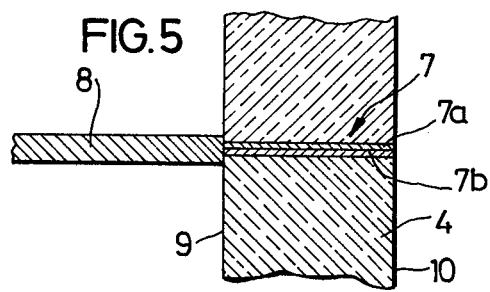
FIG. 5 shows a portion of the apparatus of FIG. 1 in a view corresponding to that of FIG. 4.

The end wall 4 is divided into three portions by two thin, parallel opaque zones 7 of elongated rectangular shape. The length of each zone 7 extends between two points on the circumference of the end wall 4, and its width is equal to the axial thickness of the end wall between its rear face 9 and front face 10. The thickness of each zone 7 is too small to permit realistic representation on the scale of FIGS. 1 and 2. As is shown in FIG. 5, it consists of a mat, black, opaque lacquer film 7a directed toward the other zone 7 and of a reflecting coating 7b of vacuum-deposited aluminum directed toward the associated lamps 5. The several end wall portions are joined by a fluid-tight cement, not itself shown.

Two flat partitions 8, axially aligned with the zones 7, extend from the inner or rear face 9 to a lens board 14 in tangential relationship to the lens system 3 and thus form a sealed chamber with the rear face 9, the front lens in the lens system 3, the housing 1, and the lens board 14. The lens board 14 has the shape of an elongated rectangle with rounded shorter sides which conformingly abut against the inner wall of the housing 1 in light-tight engagement. The segments between the lens board 14 and the inner housing wall are axially closed by reflectors 12 having a concave face opposite the lamps 5.

The end wall 4 may consist of optically ground, flat glass or of an optical grade of polymethyl methacrylate and is suitably coated to minimize internal reflection.

The housing 1 is radially mounted on projecting runners 15 and is moved on the runners by a cable 16 which may also accomodate power lines foe the lamps 5 and the camera 2, and the output line of the camera. The system of electricl conductors has not been shown in order not to crowd the drawing since it is conventional in itself. The non-illustrated end of the cable 16 is fastened to a non-illustrated winch so that it can pull the housing 1 in an axial direction indicated by an arrow while the runners engage a supporting surface.

Figure 3:
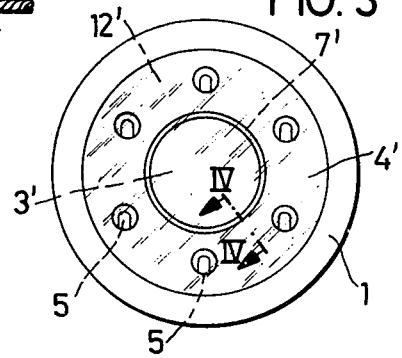
FIG. 3 shows a modification of the apparatus of FIG. 2.
Figure 4:
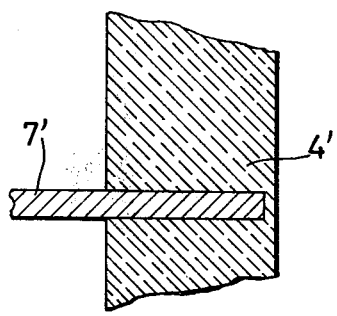
FIG. 4 illustrates a portion of the apparatus of FIG. 3 in enlarged section on the line IV-IV.

In the modified apparatus shown in FIG. 3 without its runners and connecting cable, the housing 1 is closed in one axial direction by an end wall 4' in wich a circular, central transparent portion is separated from a circularly annular peripheral portion by a laminar opaque zone 7' which extends in a closed, circular loop about the central end wall portion and is shown in more detail in FIG. 4. The zone 7' is constituted by an axially terminal portion of a tube dimensioned to envelope the lens system 3 in light-tight engagement. A circular groove in the inner face of the unitary wall 4' extends axially close to the outer wall face and conformingly receives the opaque tube 7' whose radial inner face is coated with black lacquer, while the outer face carries a reflecting aluminum coating. The distance between the leading circular edge of the tube 7' and the outer face of the end wall 4 is smaller than the thickness of the tube, and the afore-mentioned black lacquer coating, not itself shown in FIG. 4, covers the leading tube edge.

Six lamps 5 are equiangularly distributed about the tube 7' and are backed by a toroidally curved reflector 12'. No light from the lamps 5 can reach the objective lens system of the television camera in the housing 1 without being reflected from an object outside the housing.

While the invention has been described with reference to specific presently preferred embodiments, it is to be understood that it is intended to cover all changes and modifications of the examples herein chosen for the purpose of the disclosure which do not constitute departures from the spirit and scope of the invention set forth in the appended claims.

What is claimed is:

1. Visual inspection apparatus comprising:
   a. a protective housing elongated in a predetermined direction,
      1. said housing defining a cavity therein and having a transverse end wall bounding said cavity in said direction,
      2. said end wall having a plurality of transparent portions offset from each other transversely of said direction,
      3. said end wall having an inner face directed toward said cavity and an outer face, said faces being transverse to said direction;
   b. an objective lens system in said cavity aligned with one of said portions in said direction;
   c. a light source in said cavity aligned with another transparent portion of said end wall in said direction;
   d. an opaque partition in said cavity interposed between said light source and said objective lens system, said partition extending inward of said cavity from said inner face and shielding said objective lens system from the light of said source,
      1. said end wall havng an opaque zone interposed between said portions thereof and preventing passage of light from said light source through said portions to said objective lens system, said zone extending from said inner face toward said outer face,
      2. said partition being aligned with said zone in said direction; and
   e. camera means in said cavity and associated with said objective lens system for producing an image in response to light received by said objective lens system through said one portion.

2. Apparatus as set forth in claim 1, wherein said partition and said zone are respective parts of a unitary body.

3. Apparatus as set forth in claim 1, wherein said objective lens system has an optical axis transverse to said end wall in the center of said end wall, said zone extending about said axis in a closed loop.

4. Apparatus as set forth in claim 3, wherein said partition and said zone jointly constitute a unitary tubular body, said portions jointly constitute another unitary body, said inner face is formed with a loop-shaped groove therein, said zone being received in said groove, and said partition enveloping said objective lens system.

5. Apparatus as set forth in claim 1, wherein said housing is cylindrical, said objective lens system having an optical axis substantially coinciding with the axis of said housing.

6. Apparatus as set forth in claim 5, further comprising a carrier member radially projecting from said housing for engagement with a supporting surface, and moving means for moving said housing along the engaged surface.

7. Apparatus as set forth in claim 1, wherein the width of said zone separating said portions transversely to said direction is but a minor fraction of any other dimension of said zone.

8. Apparatus as set forth in claim 7, wherein the dimension of said zone in said direction is smaller than the spacing of said inner and outer faces by less than said width.

9. Apparatus as set forth in claim 7, wherein said zone connects said inner and outer faces.

10. Apparatus as set forth in claim 7, wherein said zone has first and second faces respectively engaging said one portion and said other portion, said first face being exposed to said objective lens system and consisting of light-absorbing material, and said second face being exposed to said light source and essentially consisting of light-reflecting material.

* * * * *